United States Patent
Cao

(10) Patent No.: US 9,547,514 B2
(45) Date of Patent: Jan. 17, 2017

(54) MAINTAINING VIRTUAL HARDWARE DEVICE ID IN A VIRTUAL MACHINE

(71) Applicant: VMware, Inc., Palo Alto, CA (US)

(72) Inventor: Pengzhen Cao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 84 days.

(21) Appl. No.: 14/286,921

(22) Filed: May 23, 2014

(65) Prior Publication Data

US 2015/0339144 A1 Nov. 26, 2015

(51) Int. Cl.
*G06F 9/455* (2006.01)
(52) U.S. Cl.
CPC . *G06F 9/45558* (2013.01); *G06F 2009/45562* (2013.01); *G06F 2009/45595* (2013.01)
(58) Field of Classification Search
None
See application file for complete search history.

(56) References Cited

U.S. PATENT DOCUMENTS

| | | | | |
|---|---|---|---|---|
| 8,336,046 | B2 * | 12/2012 | Bowman | G06F 9/4843 718/1 |
| 2012/0110574 | A1 * | 5/2012 | Kumar | G06F 9/45558 718/1 |

OTHER PUBLICATIONS

Banym's Blog, Change network device name from eth1 back to eth0, 2011, 6 pages.*
BigSoft, Cloning a VirtualBox machine running CentOS causes network interfaces to fail; Nov. 2013, 3 pages.*
"VMWare Image Clone Problem: eth0 Renamed As eth1", NIX Craft, Jul. 11, 2011 Also available at <URL: http://www.cyberciti.biz/tips/vmware-linux-lost-eth0-after-cloning-image.html>.
"NIC Ordering Starts from eth1 in Limux Guest OS", VMware Knowledge base, Oct. 3, 2012 Also available at <URL: http://kb.vmware.com/selfservice/microsites/search.do?language=en_US&cmd=displayKC&externalId=20021>.
"How do I Fix my Vm's Network Connection if It Seems to Be Running Ok From the Host?", Stack Overflow, Close as off topic on Feb. 8, 2012 Also available at <URL: http://stackoverflow.com/questions/175876/how-do-i-fix-my-vms-network-connection-if-it-seems-to-be-running-ok-from-the-ho>.

* cited by examiner

*Primary Examiner* — Diem Cao

(57) ABSTRACT

An example method to maintain services in a cloned virtual machine (VM) includes detecting a cloning operation of a virtual machine, the cloning operation causing the cloned virtual machine to be generated from a source virtual machine having a first virtual network interface card (VNIC) with a first machine access control (MAC) address, the cloned virtual machine having a second VNIC with a second MAC address unique from the first MAC address, and causing a device identifier associated with the second VNIC of the cloned virtual machine to be changed to match a device identifier associated with the first VNIC of the source virtual machine, the device identifier of the cloned virtual machine being generated by a guest operating system running in the cloned virtual machine upon detection of the presence of the second VNIC with the second MAC address.

6 Claims, 5 Drawing Sheets

MAINTAINING VIRTUAL HARDWARE DEVICE ID IN A VIRTUAL MACHINE

BACKGROUND

A new virtual machine (VM) may be created by cloning an existing VM. The cloning process includes copying the disk image and configurations of the existing VM and then modifying some of the configurations, such as the MAC address and security identifier (SID), to give the clone its own identity thus allowing it to reside on a network along with the original VM. As a result of the changes in virtual hardware configuration, the guest operating system, i.e., the disk operating system that executes within the cloned VM, may recognize the new virtual hardware configuration as a new device, and generate a new handle or software interface for it, which can render it inaccessible to other guest software configured to work with the original, now absent, device. As a result, the new VM may become inoperable without manually configuring the virtual hardware components so that they are consistent with the expectations of the guest software.

DETAILED DESCRIPTION

Figure 1:
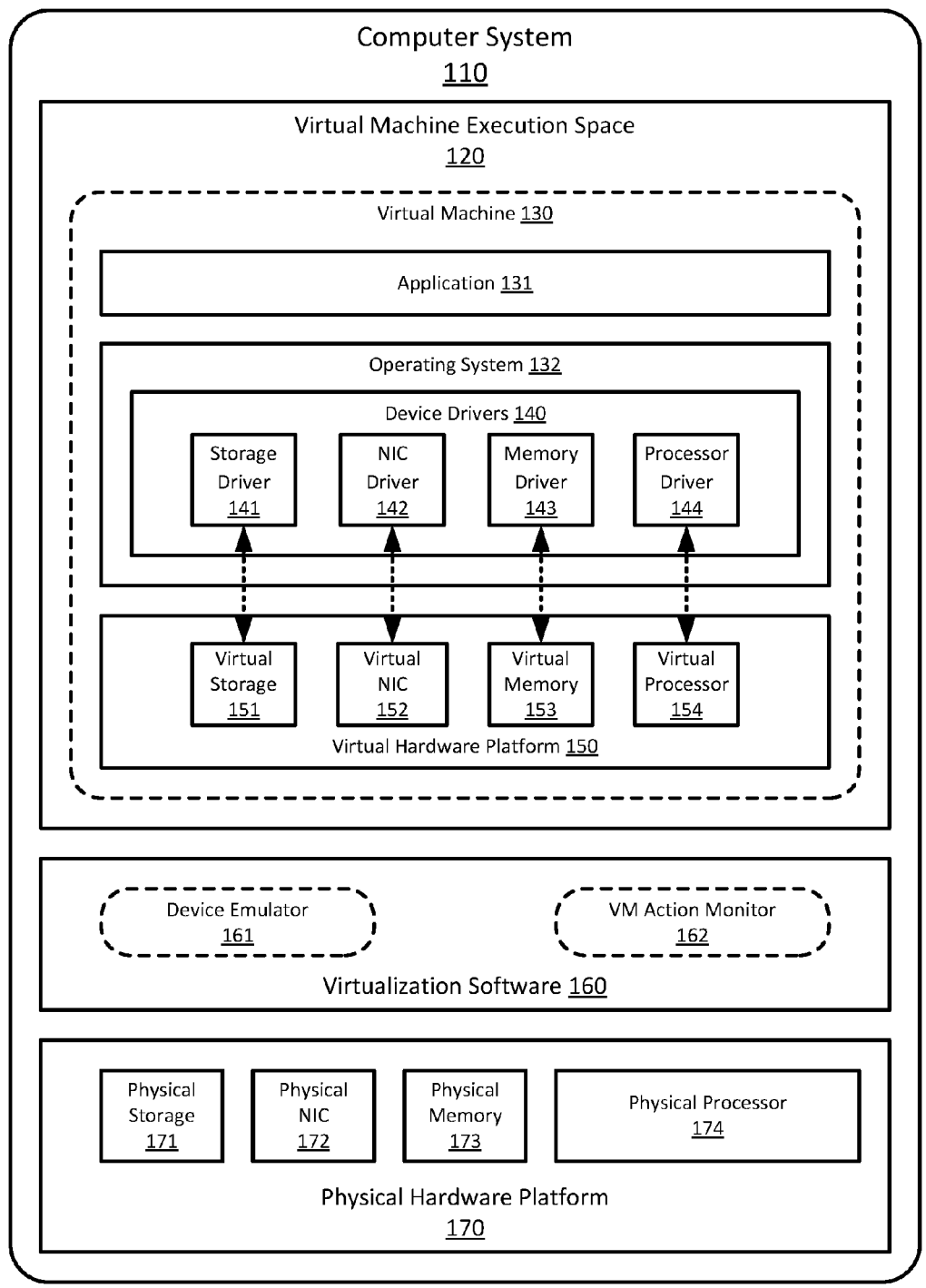
FIG. 1 illustrates a block diagram of a virtualized computer environment that can be utilized to maintain virtual hardware configurations, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a virtualized computer environment that can be utilized to maintain virtual hardware configurations after cloning, according to one or more embodiments of the present disclosure. In FIG. 1, a computer system 110 may be a computing device such as a mobile device, desktop, laptop, or server-grade hardware, which includes physical hardware platform 170 (e.g., an x86 architecture platform), virtualization software 160, and at least one virtual machine (VM) 130. Hardware platform 170 may be configured with, without limitation, physical storage 171 (e.g., a hard drive), a physical network adapter (NIC) 172, which may be, for example, an Ethernet or wireless adapter based on the 802.X specification, physical memory 173, and one or more physical symmetric multi-core processor 174. Hardware platform 170 may be configured with additional components, such as, without limitation, a mouse and keyboard (not shown in FIG. 1). During run time, multiple symmetric multi-core processors 174 may be configured to operate concurrently and may read and write to any portion of physical memory 173 and/or physical storage 171.

In one embodiment, virtualization software 160, which may include a hypervisor and a virtual machine monitor (not separately shown) executes on hardware platform 170. Virtualization software 160 may be configured to support virtual machine execution space 120 within which one or more virtual machines may be concurrently instantiated and executed. A VM is an abstraction of an actual physical computer system. The VM may be referred to as a "guest" system, while physical hardware platform 170 that the "guest" system is installed upon may be referred to as a "host" system or "host platform." For each VM 130, virtualization software 160 may be configured to provide a virtual hardware platform (e.g., the virtual hardware platform 150) dedicated to provide virtualized hardware services to VM 130.

In one embodiment, the virtual hardware platform 150 may be configured with one or more "virtual hardware components" which are implemented in hardware and/or software to emulate the physical hardware components. The virtual hardware components may include, without limitation, virtual storage 151, virtual NIC 152, virtual memory 153, and one or more virtual processors 154. These virtual hardware components may be configured to emulate physical hardware components in the physical hardware platform 170. In one embodiment, the virtual hardware platform 150 may function as an equivalent of a standard x86 hardware architecture, and may support x86-based operating systems such as, without limitation, Microsoft Windows®, Linux®, and FreeBSD.

It should be recognized that the various terms, layers and categorizations used to describe the virtualization components in FIG. 1 may be referred to differently without departing from their functionalities or the spirit and scope of the present disclosure. For example, virtual hardware platform 150 is sometimes viewed as part of VM 130 and sometimes viewed as part a corresponding virtual machine monitor (not shown) which may or may not be considered part of a hypervisor. It should further be recognized that other virtualized computer system architectures may be used along with the teachings herein. For example, the virtualization software 160 may be designed to run on top of a host operating system (not shown) and/or components of virtualization software 160 may reside in a special "control", "domain 0", or "root partition" virtual machine (not shown) that privileged access to elements of physical hardware platform 170.

In one embodiment, after VM 130 is created in virtual machine execution space 120, guest operating system (OS) 132 may be installed in VM 130 to execute and support applications such as application 131. OS 132 may be configured to include device drivers (or device interfaces) 140 that serve as interfaces to virtual hardware components 151, 152, 153, and 154 for application 131 (and OS 132).

Specifically, device drivers 140 may interact with virtual hardware components 151, 152, 153, and 154 as if these virtual hardware components were actual physical hardware components.

In one embodiment, device drivers 140 may comprise computer code that can be used to operate and/or control the virtual hardware components in virtual hardware platform 150. Specifically, each device driver may be associated with a corresponding virtual hardware component, and may interact with the virtual hardware component utilizing the communication subsystems provided by OS 132. When application 131 and/or OS 132 issue a request to one of device drivers 140, the device driver may transmit the request as a command to the corresponding virtual hardware component. Thus, device drivers 140 may be hardware-specific and OS specific. In one embodiment, device drivers 140 may include, among other drivers, storage driver 141 corresponding to virtual storage 151, network driver 142 corresponding to virtual NIC 152, memory driver 143 corresponding to virtual memory 153, and processor driver 144 corresponding to virtual processor 154. Certain details about device drivers 140 and the virtual hardware components are further described below.

In one embodiment, virtualization software 160 may be configured with device emulators 161 configured to provide or implement virtual hardware platform 150. Device emulators 161 may translate commands received by the virtual hardware components into hardware commands that can be forwarded to the physical hardware components in the physical hardware platform 170. In other words, the virtual hardware components in the virtual hardware platform 150 may be configured as interfaces to device emulators 161. And the device emulators 161 may process and respond to the commands received from the device drivers 140 via the virtual hardware components.

In one embodiment, virtualization software 160 may be configured with virtual machine action monitor 162 to monitor and detect certain actions/changes made to VM 130. For example, VM action monitor 162 may detect the creating, updating, and/or deleting of VM 130. VM action monitor 162 may also detect certain changes made to one or more hardware components in VM 130. Thus, when a virtual hardware component is created, updated, or removed from the VM, VM action monitor 162 may identify the specific virtual hardware component that is affected, as well as the action that is performed on the specific virtual hardware component. In one embodiment, VM action monitor 162 may detect a new VM being created based on an existing VM. VM action monitor 162 may then perform additional configurations on the new VM to ensure that the new VM is operable without manual configurations. Thus, VM action monitor 162 may ensure that virtual hardware services are established and functional shortly after the new VM is created.

Although illustrated in FIG. 1 as being a component of virtualization software 160, VM action monitor 162 may be implemented as an application (e.g., application 131) executing in the VM 130, or a system service, often referred to as a "daemon," in guest OS 132. VM action monitor 162 may be installed during the VM creation process, and may be initialized as a daemon to monitor and modify guest OS 132's configurations (e.g., configuration files, registry entries). VM action monitor 162 may then communicate with virtualization software 160 via any communication mechanisms made available by virtualization software, in order to trigger reconfiguration of the VM once certain actions are detected.

Figure 2:
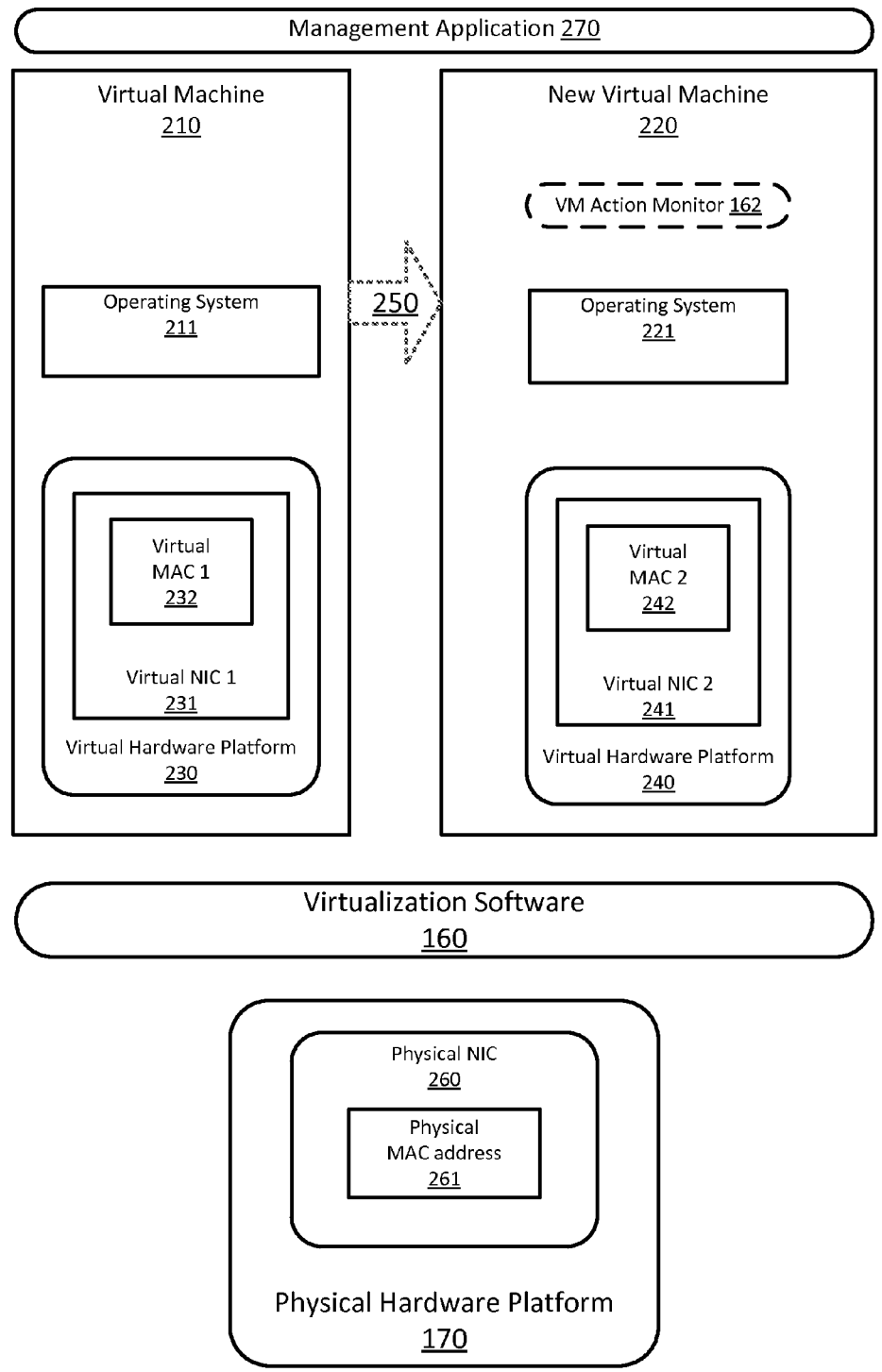
FIG. 2 illustrates a block diagram a virtualized environment within which the services of a cloned VM can be maintained, according to one or more embodiments of the present disclosure.

FIG. 2 illustrates a block diagram of a virtualized environment within which the services of a cloned VM can be maintained, according to one or more embodiments of the present disclosure. In FIG. 2, virtualization software 160, VM action monitor 162, and/or physical hardware platform 170 may be identical or similar to their respective counterparts in FIG. 1. Specifically, physical hardware platform 170 may be configured with physical network interface card (NIC) 260 (similar to physical NIC 172 of FIG. 1). VM 210 may be configured with operating system (OS) 211 (similar to OS 132 of FIG. 1) and virtual hardware platform 230 (similar to virtual hardware platform 150 of FIG. 1). Further, virtual hardware platform 230 may be configured with virtual NIC 231 (similar to virtual NIC 152 of FIG. 1).

In one embodiment, physical NIC 260 may be configured with a physical MAC address 261. Similarly, virtual NIC 231, which is associated with physical NIC 260, may be configured with virtual MAC address 232.

In one embodiment, the illustrated virtualized environment of FIG. 2 also includes management application 270 (e.g., VMware vCenter Server™), which provides a centralized platform for managing resources and VMs.

In one embodiment, a specific operation 250 associated with VM 210 may be initiated via management application 270. Some examples of operation 250 include, but not limited to, an operation to clone a source VM (e.g., VM 210), an operation to synchronize two VMs (e.g., ensure new VM 220 remains similar or identical to VM 210 when VM 210 is updated after the creation of VM 220), and others.

Suppose operation 250 is an operation to clone VM 210. VM 220, which is a copy of VM 210, is then generated. During the cloning process, a new MAC address and a new virtual NIC, such as virtual MAC address 242 and virtual NIC 241, respectively, are also generated. In response to detection of the newly added virtual NIC 241 with virtual MAC address 242, OS 221 generates a new device identifier associated with virtual NIC 241 (e.g., network device name Eth1, as opposed to network device name Eth0, which is associated with virtual NIC 231). In one embodiment, VM action monitor 162, as discussed above, may be an agent or daemon process executing in a VM (e.g., VM 220) that monitors and detects the occurrence of operation 250 and causes the network device name Eth1 to be changed to Eth0 for virtual NIC 241.

In one embodiment, VM action monitor 162 may be installed prior to the initiation of operation 250 and may maintain stored copies of virtual MAC address 232 and the device identifier associated with virtual NIC 231 (e.g., network device name Eth0). Thus, after the cloning operation begins, VM action monitor 162 may detect the occurrence of the cloning operation, from the context of VM 220, by detecting a change in virtual NICs. For example, virtual NIC 231 with virtual MAC address 232 is not present in VM 220. Instead, virtual NIC 241 with virtual MAC address 242 is. Since VM action monitor 162 maintains a stored copy of the device identifier associated with virtual NIC 231, it can change the device identifier associated with virtual NIC 241 with this stored copy. In other words, VM action monitor 162 can change the device identifier associated with virtual NIC 241, Eth1, to the stored copy, Eth0.

Figure 3:
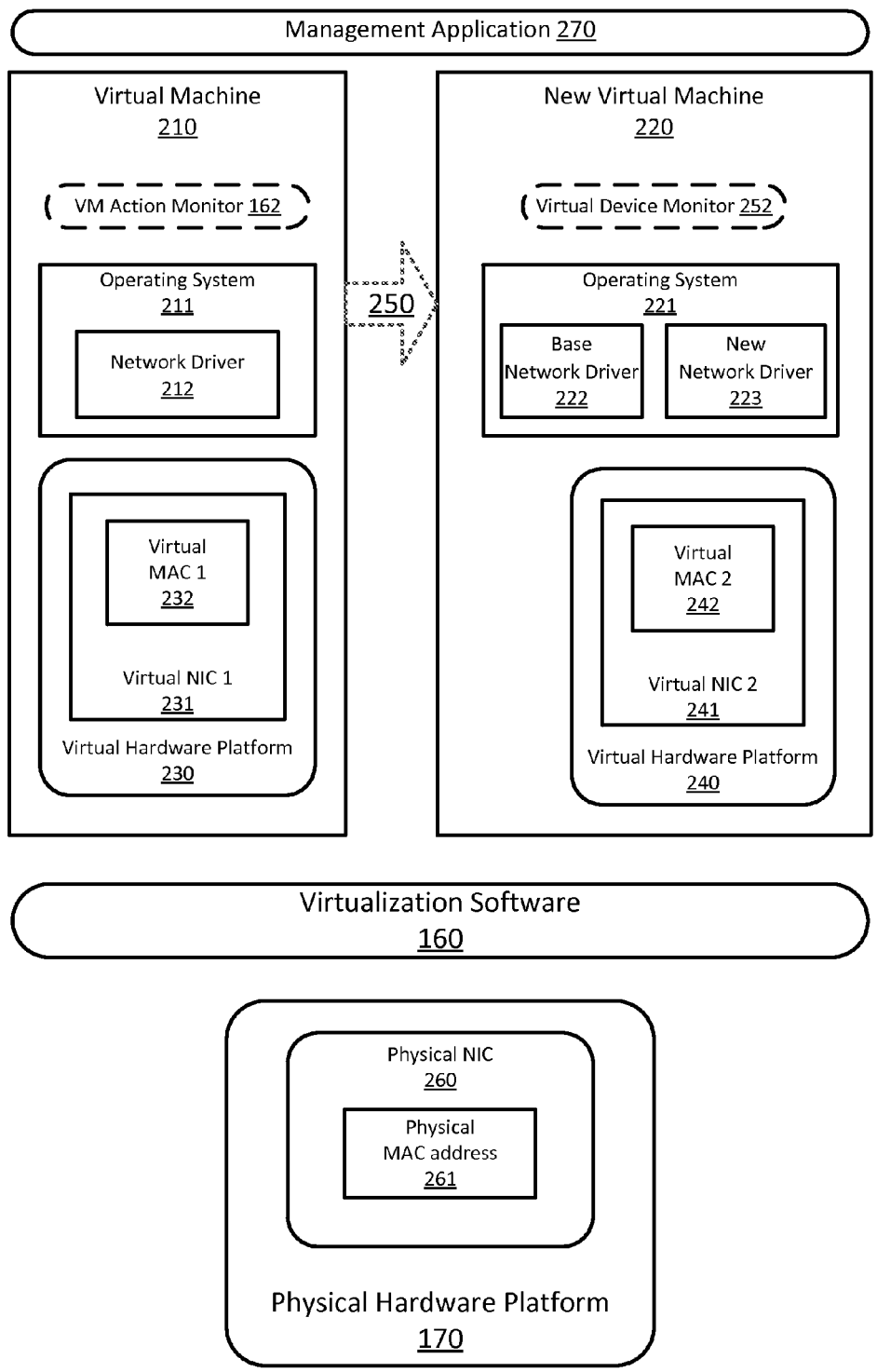
FIG. 3 illustrates another block diagram of a virtualized environment within which the services of a cloned VM can be maintained, according to one or more embodiments of the present disclosure.

FIG. 3 illustrates another block diagram of a virtualized environment within which the services of a cloned VM can be maintained, according to one or more embodiments of the present disclosure. Various components and modules in FIG. 3 correspond to their respective counterparts in FIG. 2.

In an alternative embodiment, VM action monitor 162, which may be installed in VM 210 to monitor operation 250, may communicate with target virtualization software 160 to perform the configuration of virtual devices in VM 220 as described below. A virtual device monitor 252 may be installed in VM 220 to perform the configuration of a virtual NIC after VM 220 is created based on VM 210. Virtual device monitor 252 may execute in VM 220 as an agent or daemon process. During operation, virtual device monitor 252 may listen to a network message from VM action monitor 162, and in response to the message, perform the configuration of virtual devices in VM 220.

As discussed above, in one embodiment, operation 250 may be a cloning operation, where VM 220 is generated based on VM 210. This cloning operation may include a process to create base network driver 222 in VM 220. Specifically, operation 250 may generate base network driver 222 in the OS 221 by making a copy of network driver 212. VM 220 may optionally have two network drivers, one being base network driver 222 which is identical or similar to network driver 212, and the other being new network driver 223 which is created based on virtual NIC 241. Further, operation 250 may duplicate a source driver configuration file (not shown), which is associated with network driver 212 for base network driver 222. In other words, after being created, base network driver 222 may contain a cloned driver configuration file which is similar or identical to the source driver configuration.

In one embodiment, VM action monitor 162 in VM 210 may be configured to detect operation 250 during the creation of VM 220. Once operation 250 is detected, VM action monitor 162 may transmit a message to virtual device monitor 252 using network communication channels (e.g., remote procedure calls) between the virtualization software 160 and VM 220, or between VM 210 and VM 220. Virtual device monitor 252 may act as a daemon to continuously listen to such a message. Once it receives the message, virtual device monitor 252 may evaluate the generation and operations of the device drivers in the new VM 220. Specifically, virtual device monitor 252 may track how device drivers in new VM 220 are created, and detect that one or more device drivers (e.g., base network drivers 222) that are not functional in VM 220. Further, virtual device monitor 252 may extract driver configuration information of the non-functioning device drivers to determine the causes of the non-functioning issues. For example, virtual device monitor 252 may detect that base network driver 222 is not functioning and determine an approach to automatically fix the identified issues without requiring any manual configurations.

In one embodiment, in response to operation 250, virtual device monitor 252 may automatically fix issues related to base network driver 222 by removing base network driver 222 but including some data in the cloned drive configuration file (e.g., network device name Eth0) in the driver configuration file associated with new network driver 223. Thus, new network driver 223 may communicate with virtual NIC 241 associated with the device identifier Eth0.

In one embodiment, the above approach may be applicable to the automatic reconfiguration of other device drivers (e.g., storage driver) and virtual hardware components (e.g., virtual storage). For example, when operation 250 is to clone a new virtual storage based on a source virtual storage in VM 210, virtual device monitor 252 may automatically reconfigure the new virtual storage to ensure uninterrupted operation without manual intervention.

Figure 4:
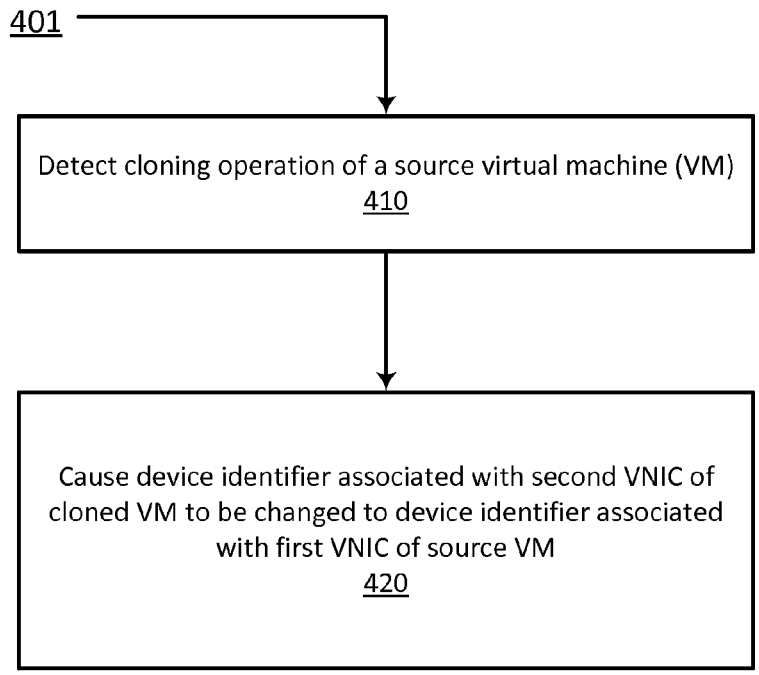
FIG. 4 shows a flow diagram illustrating a process to maintain services of a cloned VM, according to one or more embodiments of the present disclosure.

FIG. 4 shows a flow diagram illustrating a process to maintain services of a cloned VM, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

In conjunction with FIG. 2, at block 410, an agent process, such as VM action monitor 162, executing in a VM (e.g., VM 220), may detect an operation based on a source VM (e.g., VM 210) to generate a cloned VM (e.g., VM 220). VM 210 has a first virtual device (e.g., virtual NIC 231) with a first property (e.g., virtual MAC address 232), and VM 220, the cloned VM, has a second virtual device (e.g., virtual NIC 241) with a second property (e.g., virtual MAC address 242). Virtual MAC address 242 is unique from virtual MAC address 232.

Since OS 221 of VM 220 detects the absence of virtual NIC 231 with virtual MAC address 232 and the presence of a new virtual NIC with a different MAC address (e.g., virtual NIC 241 with virtual MAC address 242), OS 221 generates a new device identifier (e.g., Eth1) for virtual NIC 241.

At block 420, VM action monitor 162 may cause a change of this new device identifier to match the device identifier associated with virtual NIC 231 (e.g., Eth0) without any manual intervention. For example, VM action monitor 162 may be installed prior to the cloning operation, and it may maintain a stored copy of virtual MAC address 232 and the device identifier associated with virtual NIC 231. Once VM action monitor 162 detects that virtual NIC 241 is associated with virtual MAC address 242, which is different from virtual address 232, it causes the newly generated device identifier for virtual NIC 241 to be changed to match the stored copy of the device identifier associated with virtual NIC 231.

Figure 5:
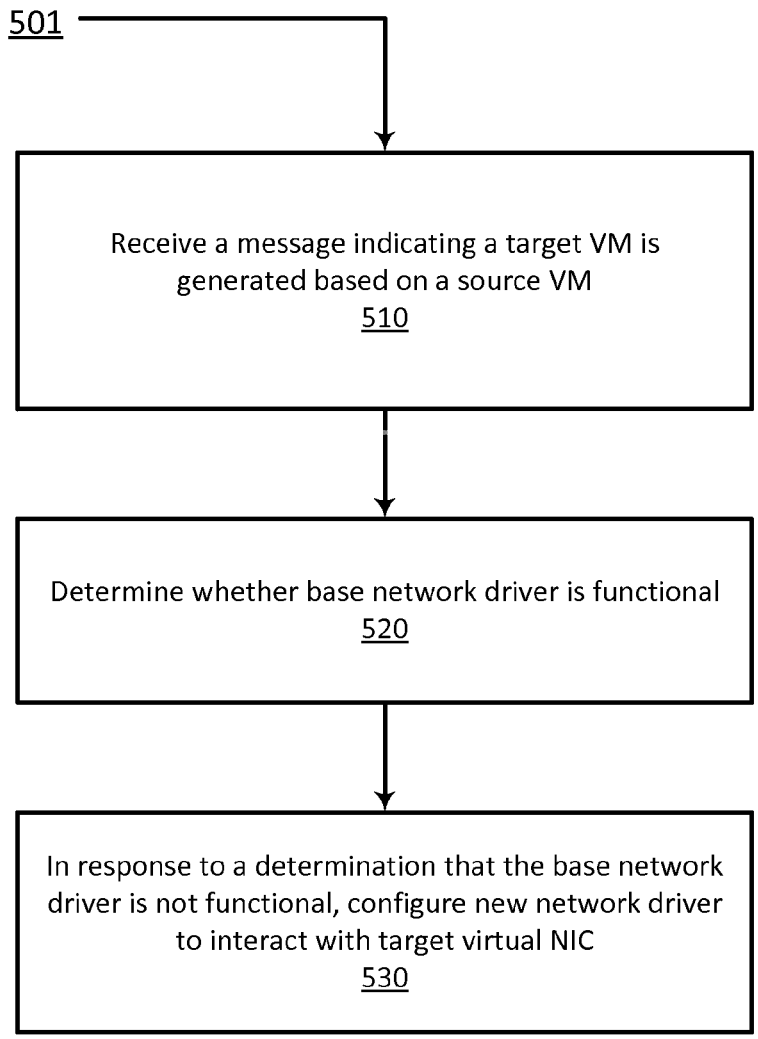
FIG. 5 shows a flow diagram illustrating another process to maintain services of a cloned virtual machine, according to one or more embodiments of the present disclosure.

FIG. 5 shows a flow diagram illustrating another process to maintain services of a cloned VM, according to one or more embodiments of the present disclosure. The processes 501 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

In conjunction with FIG. 3, at block 510, a virtual device monitor (e.g., virtual device monitor 252) executing in a target VM (e.g., VM 220) may be configured to listen to remote messages from a VM action monitor (e.g., VM action monitor 162) potentially executing in a source VM (e.g., VM 210). Virtual device monitor 252 may receive the message from VM action monitor 162 indicating VM 220 is generated based on VM 210.

As discussed above, during the cloning operation, in one embodiment, base network driver 222 in VM 220 may be generated by by making a copy of network driver 212 in VM 210.

At block 520, in response to the received message, virtual device monitor 252 may determine whether base network driver 222 is functional. In one embodiment, virtual device monitor 252 may try to utilize the base network driver 222 for network communications, and virtual device monitor 252 may determine that base network driver 222 is not functional without reconfiguration.

At block 530, in response to a determination that the base network driver is not functional, the virtual device monitor may configure new network driver 223 to communicate with virtual NIC 241 with the device identifier of virtual NIC 231.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Thus, systems and methods for maintaining services in a cloned VM have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments of the present disclosure may be implemented as one or more computer programs or as one or more computer program modules embodied in one or more computer-readable storage media. The term computer-readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for maintaining services in a cloned virtual machine, the method comprising:
   detecting a cloning operation of a virtual machine, by an agent process executing within the cloned virtual machine, the cloning operation causing the cloned virtual machine to be generated from a source virtual machine having a first virtual network interface card (VNIC) with a first machine access control (MAC) address, the cloned virtual machine having a second VNIC with a second MAC address unique from the first MAC address, wherein the detecting of the cloning operation comprises:
   from the context of the cloned virtual machine, detecting a change in VNICs, wherein the first VNIC having the first MAC address of the source virtual machine is no longer present in the cloned virtual machine, and a new VNIC having a different MAC address is present, the new VNIC being the second VNIC of the cloned virtual machine; and
   causing a device identifier associated with the second VNIC of the cloned virtual machine to be changed, by the agent process executing within the cloned virtual machine, to match a device identifier associated with the first VNIC of the source virtual machine, the device identifier of the cloned virtual machine being generated by a guest operating system running in the cloned virtual machine upon detection of the presence of the second VNIC with the second MAC address.

2. The method of claim 1, wherein the agent process is installed prior to the cloning operation and maintains a stored copy of the first MAC address and a device identifier associated with the first VNIC of the source virtual machine, and after the cloning operation, detects that the second VNIC has the second MAC address and changes the device identifier associated with the second VNIC with the second MAC address to match the stored copy of the device identifier.

3. A non-transitory computer-readable storage medium that includes a set of instructions for maintaining services in a cloned virtual machine, which in response to execution by a processor, causes the processor to execute an agent process within the cloned virtual machine, and the agent process is configured to:
   detect a cloning operation of a virtual machine, the cloning operation causing the cloned virtual machine to be generated from a source virtual machine having a first virtual network interface card (VNIC) with a first machine access control (MAC) address, the cloned virtual machine having a second VNIC with a second MAC address unique from the first MAC address, wherein the detection of the cloning operation, from the context of the cloned virtual machine, includes detecting a change in VNICs, wherein the first VNIC having the first MAC address of the source virtual machine is no longer present in the cloned virtual machine, and a new VNIC having a different MAC address is present, the new VNIC being the second VNIC of the cloned virtual machine; and cause a device identifier associated with the second VNIC of the cloned virtual machine to be changed to match a device identifier associated with the first VNIC of the source virtual machine, the device identifier of the cloned virtual machine being generated by a guest operating system running in the cloned virtual machine upon detection of the presence of the second VNIC with the second MAC address.

4. The non-transitory computer-readable storage medium of claim 3, wherein the agent process is installed prior to the cloning operation and maintains a stored copy of the first MAC address and a device identifier associated with the first VNIC of the source virtual machine, and after the cloning operation, detects that the second VNIC has the second MAC address and changes the device identifier associated with the second VNIC with the second MAC address to match the stored copy of the device identifier.

5. A method for maintaining services in a cloned virtual machine, the method comprising:

detecting a cloning operation of a virtual machine, by an agent process executing within the cloned virtual machine, the cloning operation causing the cloned virtual machine to be generated from a source virtual machine having a first virtual device with a first property, the cloned virtual machine having a virtual device with a second property different from the first property, wherein the detecting of the cloning operation comprises, from the context of the cloned virtual machine, detecting a change in the first property to the second property, wherein the first virtual device having the first property is no longer present in the cloned virtual machine, and a new virtual device having the different second property is present, the new virtual device being the second virtual device of the cloned virtual machine, and wherein the first and second virtual devices include a first VNIC and a second VNIC, respectively, and the first and second properties include a first machine access control (MAC) address and a second MAC address, respectively; and causing a device identifier associated with the second virtual device of the cloned virtual machine to be changed, by an agent process executing within the cloned virtual machine, to match a device identifier associated with the first virtual device of the source virtual machine, the device identifier of the cloned virtual machine being generated by a guest operating system running in the cloned virtual machine upon detection of the presence of the second virtual device with the second property.

6. The method of claim 5, wherein the agent process is installed prior to the cloning operation and maintains a stored copy of the first property and a device identifier associated with the first virtual device of the source virtual machine, and after the cloning operation, detects that the second virtual has the second property and changes the device identifier associated with the second virtual device with the second property to match the stored copy of the device identifier.

* * * * *